United States Patent
Chu et al.

(10) Patent No.: US 9,686,180 B2
(45) Date of Patent: Jun. 20, 2017

(54) MANAGING ROUTING INFORMATION FOR TUNNEL ENDPOINTS IN OVERLAY NETWORKS

(71) Applicant: Cisco Technology, Inc., San Jose, CA (US)

(72) Inventors: Kit Chiu Chu, Fremont, CA (US); Thomas J. Edsall, Los Gatos, CA (US); Navindra Yadav, Cupertino, CA (US); Francisco M. Matus, Saratoga, CA (US); Krishna Doddapaneni, Cupertino, CA (US); Satyam Sinha, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 268 days.

(21) Appl. No.: 14/477,791

(22) Filed: Sep. 4, 2014

(65) Prior Publication Data

US 2015/0124822 A1    May 7, 2015

Related U.S. Application Data

(60) Provisional application No. 61/900,333, filed on Nov. 5, 2013.

(51) Int. Cl.
*H04L 12/703* (2013.01)
*H04L 12/26* (2006.01)
(Continued)

(52) U.S. Cl.
CPC .......... *H04L 45/28* (2013.01); *H04L 12/4633* (2013.01); *H04L 12/4641* (2013.01);
(Continued)

(58) Field of Classification Search
CPC ....... H04L 45/02; H04L 45/021; H04L 45/08; H04L 45/22; H04L 45/28; H04L 45/32;
(Continued)

(56) References Cited

U.S. PATENT DOCUMENTS 6,230,231 B1    5/2001  DeLong et al.
6,769,033 B1    7/2004  Bass et al.
(Continued)

FOREIGN PATENT DOCUMENTS

WO    WO 2006/101668    9/2006
WO    WO 2009/115480    9/2009

OTHER PUBLICATIONS

International Search Report and Written Opinion for PCT/US2014/063555, mailed Feb. 5, 2015, 10 pages.

(Continued)

*Primary Examiner* — Habte Mered
(74) *Attorney, Agent, or Firm* — Polsinelli LLP

(57) ABSTRACT

Systems, methods, and non-transitory computer-readable storage media for managing routing information in overlay networks. A first tunnel endpoint in an overlay network may receive an encapsulated packet from a second tunnel endpoint. The encapsulated packet may have been encapsulated at the second tunnel endpoint based on another packet originating from a source host that is associated with the second tunnel endpoint. The encapsulated packet can include a source host address for the source host and a source tunnel endpoint address for the second tunnel endpoint. The first tunnel endpoint can then update a lookup table based on an association between the source host address and the source tunnel endpoint address.

18 Claims, 11 Drawing Sheets

(51) Int. Cl.
*H04L 12/46* (2006.01)
*H04L 12/741* (2013.01)
*H04L 29/12* (2006.01)
*H04L 12/751* (2013.01)
*H04L 29/06* (2006.01)
*H04L 12/58* (2006.01)
*H04L 29/08* (2006.01)
*H04L 12/707* (2013.01)
*H04L 12/709* (2013.01)
*H04L 12/723* (2013.01)

(52) U.S. Cl.
CPC ...... *H04L 43/0852* (2013.01); *H04L 43/0894* (2013.01); *H04L 43/16* (2013.01); *H04L 45/02* (2013.01); *H04L 45/22* (2013.01); *H04L 45/245* (2013.01); *H04L 45/50* (2013.01); *H04L 45/745* (2013.01); *H04L 51/14* (2013.01); *H04L 61/2503* (2013.01); *H04L 67/10* (2013.01); *H04L 69/22* (2013.01)

(58) Field of Classification Search
CPC ......... H04L 45/44; H04L 45/50; H04L 45/54; H04L 45/245; H04L 45/742; H04L 45/745; H04L 12/4633; H04L 12/4641; H04L 12/4645; H04L 43/16; H04L 43/0852; H04L 43/0894; H04L 51/14; H04L 61/2503; H04L 67/10; H04L 69/22
See application file for complete search history.

(56) References Cited

U.S. PATENT DOCUMENTS

| | | | |
|---|---|---|---|
| 7,379,459 B2* | 5/2008 | Ohnishi | H04L 12/462 370/392 |
| 7,742,406 B1 | 6/2010 | Muppala | |
| 7,940,763 B1 | 5/2011 | Kastenholz | |
| 8,190,843 B1 | 5/2012 | de Forest et al. | |
| 8,874,876 B2 | 10/2014 | Bhadra et al. | |
| 9,053,070 B1 | 6/2015 | Arguelles | |
| 2003/0123462 A1* | 7/2003 | Kusayanagi | H04L 12/2856 370/401 |
| 2006/0183488 A1 | 8/2006 | Billhartz | |
| 2007/0133566 A1 | 6/2007 | Copps | |
| 2008/0243495 A1 | 10/2008 | Anandakumar et al. | |
| 2009/0086629 A1 | 4/2009 | Zhang et al. | |
| 2009/0238179 A1* | 9/2009 | Samprathi | H04L 12/4625 370/389 |
| 2011/0007638 A1 | 1/2011 | Xu et al. | |
| 2011/0213894 A1 | 9/2011 | Silberstein et al. | |
| 2011/0268118 A1 | 11/2011 | Schlansker et al. | |
| 2011/0274053 A1 | 11/2011 | Baik et al. | |
| 2011/0286324 A1 | 11/2011 | Bellagamba et al. | |
| 2013/0100810 A1 | 4/2013 | Slothouber | |
| 2013/0107889 A1* | 5/2013 | Barabash | H04L 45/64 370/409 |
| 2013/0121172 A1 | 5/2013 | Cheng et al. | |
| 2013/0155846 A1 | 6/2013 | Ramachandran et al. | |
| 2013/0311637 A1* | 11/2013 | Kamath | H04L 29/08576 709/224 |
| 2013/0322453 A1* | 12/2013 | Allan | H04L 12/4662 370/395.53 |
| 2014/0064278 A1* | 3/2014 | Santos | H04L 45/54 370/392 |
| 2014/0086253 A1* | 3/2014 | Yong | H04L 12/4633 370/395.53 |
| 2014/0269705 A1* | 9/2014 | DeCusatis | H04L 45/52 370/390 |
| 2014/0269710 A1* | 9/2014 | Sundaram | H04L 45/302 370/392 |
| 2015/0009992 A1 | 1/2015 | Zhang | |
| 2015/0058470 A1* | 2/2015 | Duda | H04L 12/4633 709/224 |
| 2015/0073920 A1 | 3/2015 | Pashkevich et al. | |
| 2015/0082418 A1* | 3/2015 | Gu | H04L 12/4633 726/15 |
| 2015/0103679 A1* | 4/2015 | Tessmer | H04L 43/0811 370/252 |
| 2015/0124590 A1 | 5/2015 | Chu et al. | |
| 2015/0124640 A1 | 5/2015 | Chu et al. | |
| 2015/0124821 A1 | 5/2015 | Chu et al. | |
| 2015/0127701 A1 | 5/2015 | Chu et al. | |
| 2015/0188769 A1* | 7/2015 | Gu | H04L 12/4641 726/3 |
| 2015/0222516 A1 | 8/2015 | Deval et al. | |

OTHER PUBLICATIONS

Cisco Systems, Inc., "Cisco Nexus 1000V VXLAN Configuration Guide, Release 4.2(1)SV2(2.1), Chapter 1, Information About VXLANs," Jun. 21, 2013, 6 pages.

Onisick, Joe, "VXLAN Deep Dive," Genesis Framework, Wordpress, Nov. 6, 2012, 8 pages.

VMware, Inc., "VMware Network Virtualization Design Guide, Technical White Paper," Jan. 2013, 25 pages.

* cited by examiner

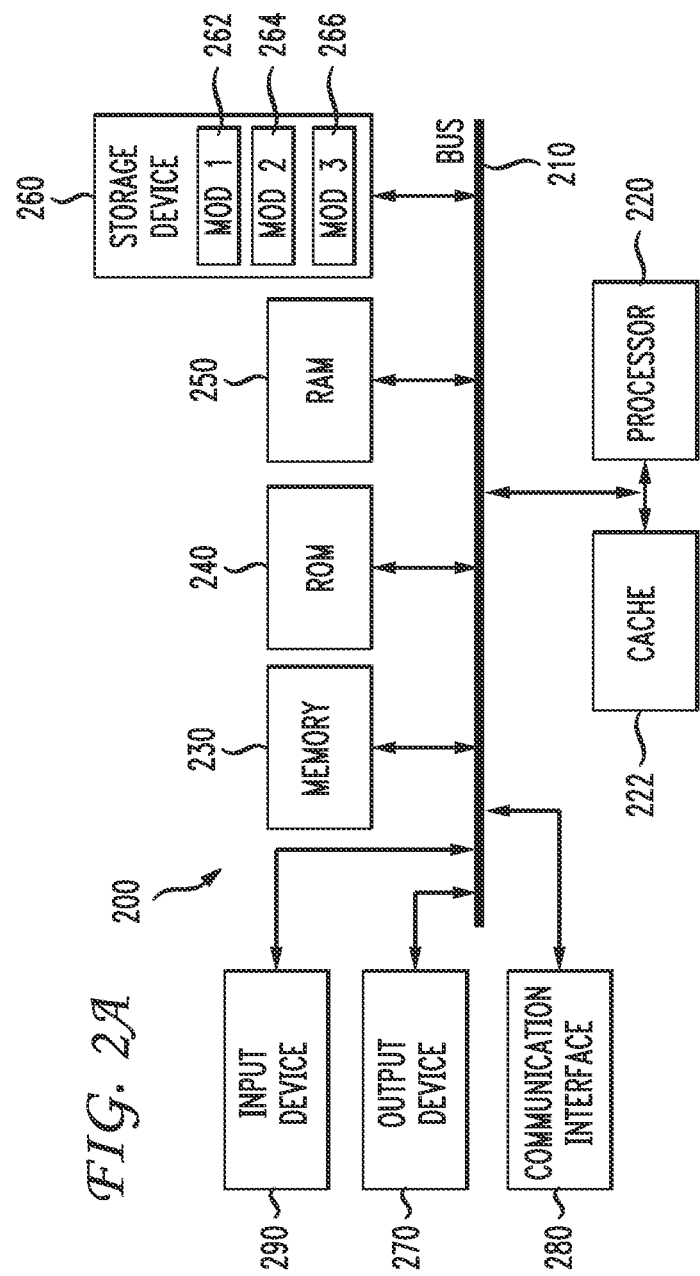

MANAGING ROUTING INFORMATION FOR TUNNEL ENDPOINTS IN OVERLAY NETWORKS

RELATED APPLICATIONS

This application claims priority to U.S. Provisional Patent Application No. 61/900,333, filed Nov. 5, 2013, the content of which is incorporated herein by reference in its entirety.

TECHNICAL FIELD

The present technology pertains to network virtualization, and more specifically pertains to routing packets in overlay networks.

BACKGROUND

Overlay network technologies, such as Virtual Extensible Local Area Networks (VXLANs), offer a highly scalable solution to managing cloud computing deployments by allowing OSI layer 2 networks to expand beyond layer 3 network boundaries through network virtualization. Layer 2 data traffic, such as Media Access Control (MAC) Ethernet frames, can be encapsulated within layer 3 packets, such as User Datagram Protocol (UDP) packets, to travel across layer 3 boundaries to reach its destination within the overlay network.

Various tunnel endpoints within the overlay network, such as Virtual Tunnel Endpoints (VTEPs), can terminate overlay network packets by encapsulating and de-encapsulating packets through MAC-to-UDP encapsulation. Each tunnel endpoint may be provided with a unique IP/MAC address pair to make the encapsulation and routing encapsulated packets within the overlay network possible. In an overlay network such as a VXLAN network or Network Virtualization using Generic Routing Encapsulation (NVGRE), the associations between host addresses and tunnel endpoints are typically created by a central controller and those mappings are distributed to all the tunnel endpoints in the overlay network.

In environments such as large-scale data centers, the database storing these mappings can grow very large and consume a large amount of storage resources at individual tunnel endpoints all across the network. Besides the storage requirements, any change in this database would then need to be distributed from the central controller and processed at every tunnel endpoint. Thus, the amount of storage and processing required to maintain a central routing table imposes a significant constraint to the number of hosts an overlay network can support. In addition, this requirement makes it more difficult to implement overlay processing in hardware to improve traffic throughput because of the silicon area limitation. Having one single central server may also mean that there exists a single point of failure, which tends to increase security risks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 2A-2B illustrate example system embodiments according to some aspects of the subject technology;

DESCRIPTION OF EXAMPLE EMBODIMENTS

Figure 1:
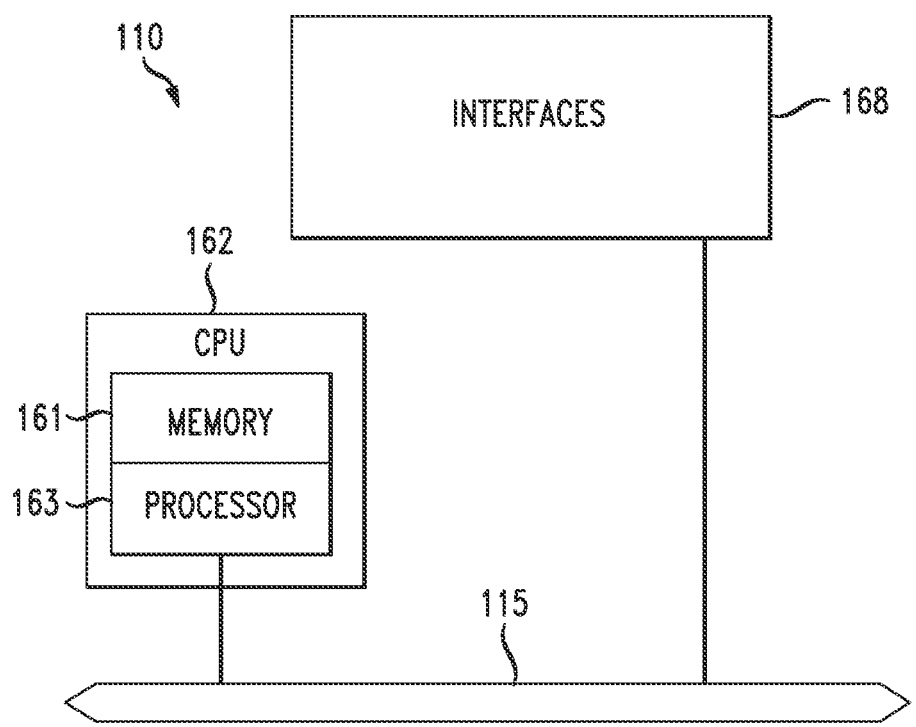
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Systems, methods, and computer-readable storage devices are disclosed which address the issues raised above regarding managing routing information for tunnel endpoints in an overlay network. According to the various embodiments disclosed herein, a first tunnel endpoint in an overlay network can receive an encapsulated packet from a second tunnel endpoint. The encapsulated packet may have been encapsulated at the second tunnel endpoint based on a packet originating from a source host associated with the second tunnel endpoint. The encapsulated packet can include a source host address for the source host and a source tunnel endpoint address for the second tunnel endpoint.

The first tunnel endpoint can update a lookup table based on an association between the source host address and the source tunnel endpoint address. The proposed methods may also use conversation learning to reduce the amount of storage and processing required at each tunnel endpoint.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNID), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for managing routing information in overlay networks. Disclosed are systems, methods, and computer-readable storage media for receiving an encapsulated packet from a tunnel endpoint and updating a lookup table based on an association between a source host address and a source tunnel endpoint address contained in the encapsulated packet received. A brief introductory description of example systems and networks, as illustrated in FIGS. 1 through 4, is disclosed herein. A detailed description of managing a lookup table, related concepts, and example variations, will then follow. These variations shall be described herein as the various embodiments are set forth. The disclosure now turns to FIG. 1.

FIG. 1 illustrates an example network device 110 suitable for implementing the present invention. Network device 110 includes master central processing unit (CPU) 162, interfaces 168, and bus 115 (e.g., a PCI bus). When acting under the control of appropriate software or firmware, CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, memory 161 (such as non-volatile RAM and/or ROM) also forms part of CPU 162. However, there are many different ways in which memory could be coupled to the system.

Interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2B:
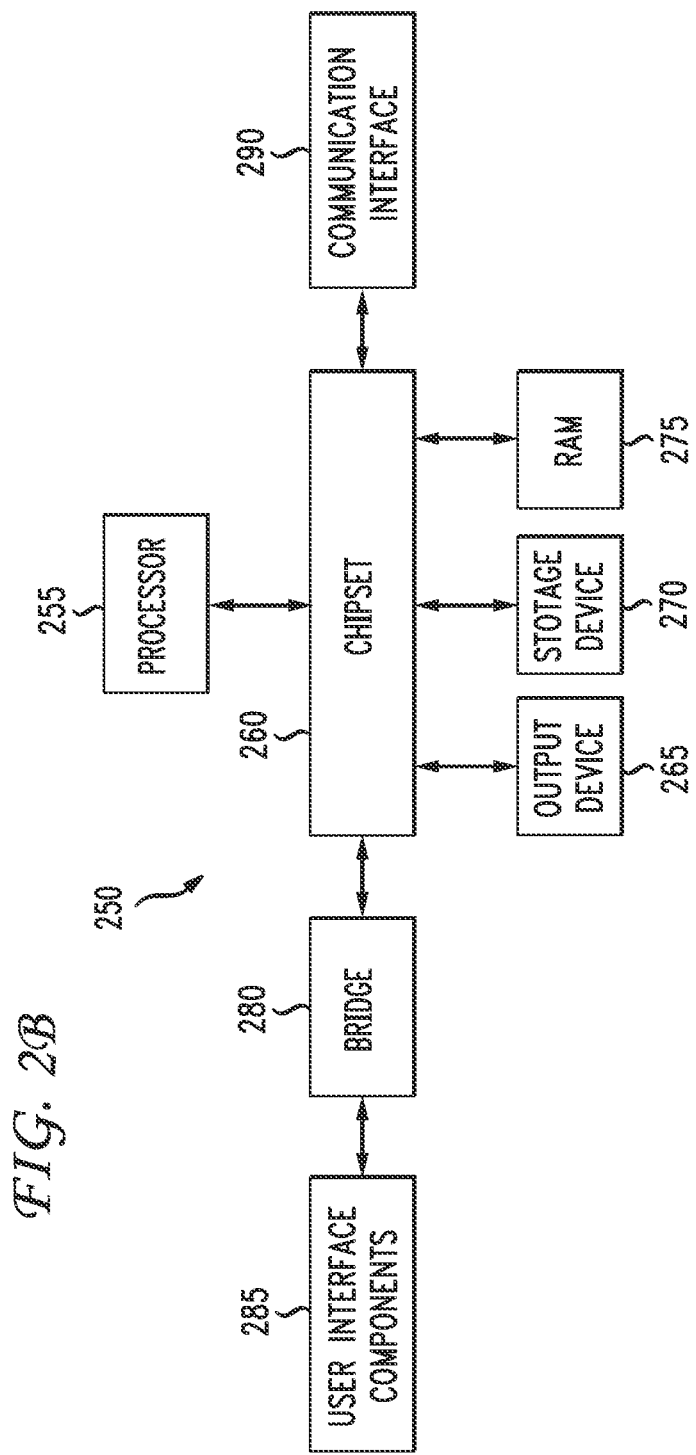

FIG. 2A and FIG. 2B illustrate example system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Example system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 (232), module 2 (234), and module 3 (236) stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions, by interpreting these inputs using processor 255.

It can be appreciated that example systems 200 and 250 can have more than one processor 210 or be part of a group or cluster of computing devices networked together to provide greater processing capability.

Figure 3:
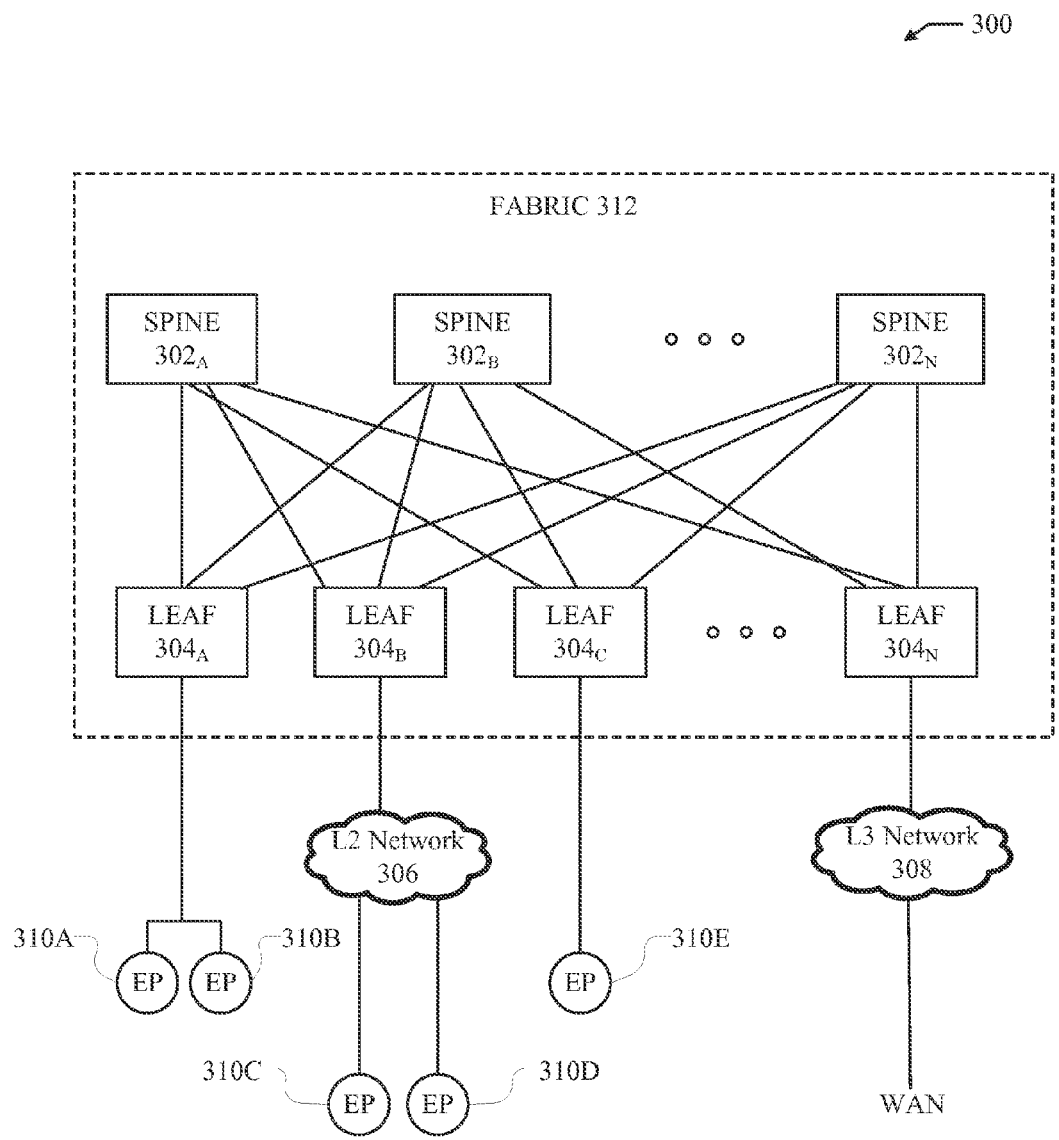
FIG. 3 illustrates a schematic block diagram of an example architecture for a network fabric.

FIG. 3 illustrates a schematic block diagram of an example architecture 300 for a network fabric 312. Network fabric 312 can include spine switches $302_A$, $302_B$, ..., $302_N$ (collectively "302") connected to leaf switches $304_A$, $304_B$, $304_C$, ..., $304_N$ (collectively "304") in network fabric 312.

Spine switches 302 can be L3 switches in fabric 312. However, in some cases, spine switches 302 can also, or otherwise, perform L2 functionalities. Further, spine switches 302 can support various capabilities, such as 40 or 10 Gbps Ethernet speeds. To this end, spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. Spine switches 302 can then perform a lookup of their local mapping database to determine the correct locator address of the packet and forward the packet to the locator address without changing certain fields in the header of the packet.

When a packet is received at spine switch $302_i$, spine switch $302_i$ can first check if the destination locator address is a proxy address. If so, spine switch $302_i$ can perform the proxy function as previously mentioned. If not, spine switch $302_i$ can lookup the locator in its forwarding table and forward the packet accordingly.

Spine switches 302 connect to leaf switches 304 in fabric 312. Leaf switches 304 can include access ports (or non-fabric ports) and fabric ports. Fabric ports can provide uplinks to spine switches 302, while access ports can provide connectivity for devices, hosts, endpoints, VMs, or external networks to fabric 312.

Leaf switches 304 can reside at the edge of fabric 312, and can thus represent the physical network edge. In some cases, leaf switches 304 can be top-of-rack (ToR) switches configured according to a ToR architecture. In other cases, leaf switches 304 can be aggregation switches in any particular topology, such as end-of-row (EoR) or middle-of-row (MoR) topologies. The leaf switches 304 can also represent aggregation switches, for example. In some embodiments, spine switches 302 and leaf switches 304 can be arranged in a Clos network topology. In other embodiments, spine switches 302 and leaf switches 304 can be arranged in a fat tree network topology.

Leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in fabric 312 can flow through the leaf switches 304. Here, leaf switches 304 can provide servers, resources, endpoints, external networks, or VMs access to fabric 312, and can connect leaf switches 304 to each other. In some cases, leaf switches 304 can connect EPGs to fabric 312 and/or any external networks. Each EPG can connect to fabric 312 via one of the leaf switches 304, for example.

Endpoints 310A-E (collectively "310") can connect to fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
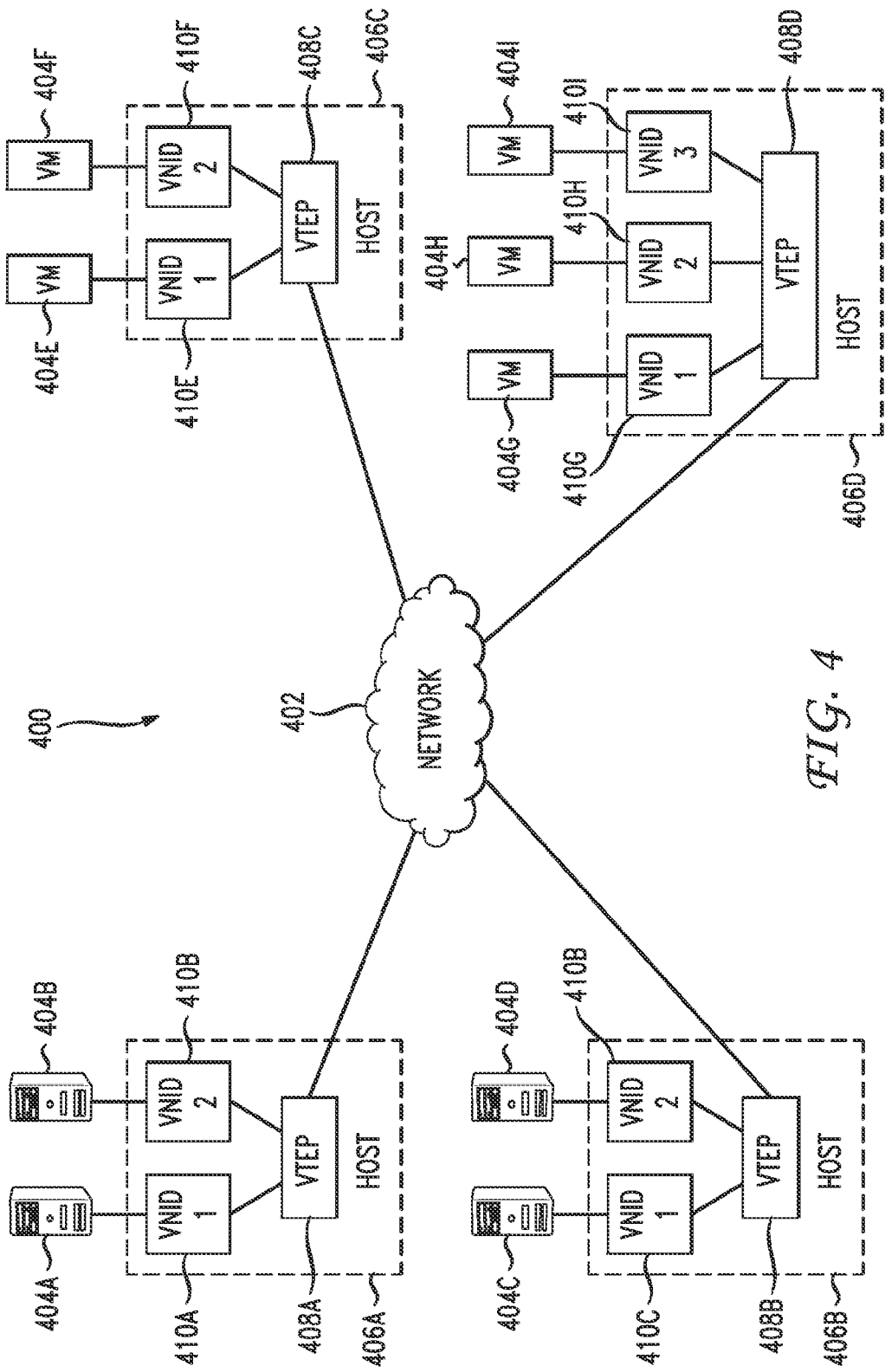
FIG. 4 illustrates an example overlay network.

FIG. 4 illustrates an example overlay network 400. Overlay network 400 uses an overlay protocol, such as VXLAN, NVGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Each host 406A-D can be a Virtual Ethernet Module (VEM) that is assigned at least one IP address used as the source IP address when the encapsulated MAC frames are sent to other VEMs over the network. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. In some embodiments where network 400 may be a VXLAN network, VNIDs can be VXLAN IDs that are used to segment and identify virtual networks. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. In this regard, various endpoints such as servers 404A-D and VMs 404E-I may be also referred to as hosts. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, also known as a lookup table or an encapsulation table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5:
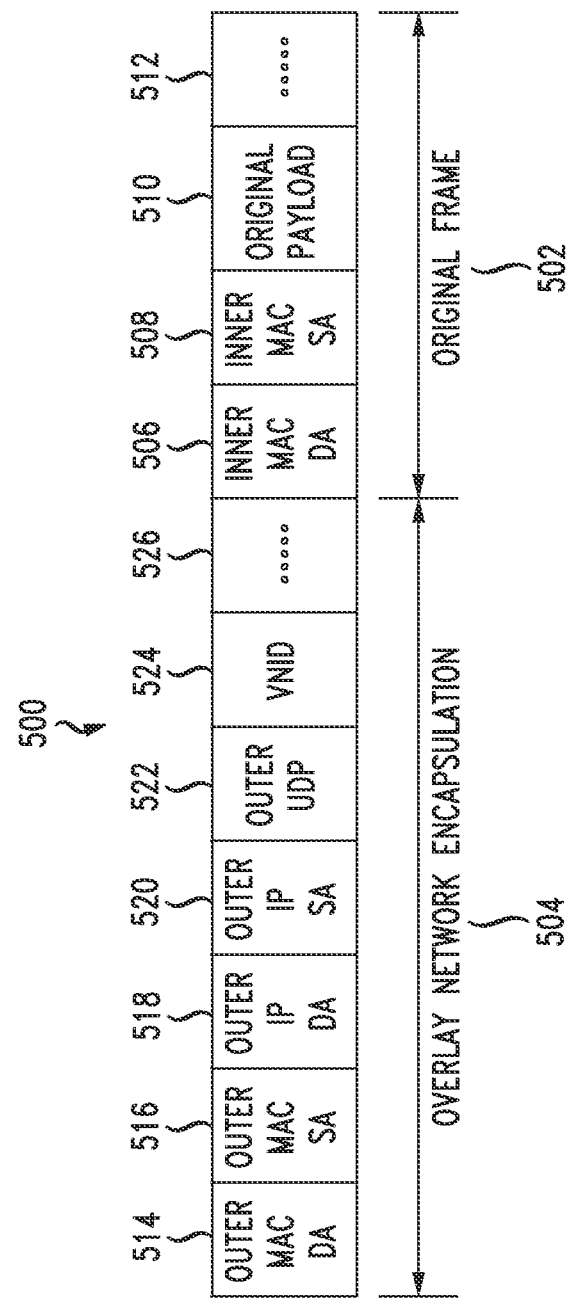
FIG. 5 illustrates an example layout of an encapsulated packet.

FIG. 5 illustrates an example layout of an encapsulated packet. Encapsulated packet 500, such as a VXLAN encapsulated packet, may consist of original frame 502 combined with overlay network encapsulation 504. Overlay network encapsulation 504 can be a header. Both original frame 502 and overlay network encapsulation header 504 may consist of component data segments or bits 506-526. However, one of ordinary skill in the art will recognize that the exact layout of the packet may differ from the example layout 500 as shown in FIG. 5. For example, data segments 506-526 may be rearranged in a different order, one or more example data segments 506-526 may be omitted, and/or other data segment(s) not shown in FIG. 5 may be added to layout 500. Original frame 502 may be an L2 packet such as an Ethernet frame. It may have original payload 510, which represents the actual data that the packet is tasked with transmitting from one node to another node in the network. In an Ethernet packet, original payload 510 would be an original Ethernet payload. Original frame 502 may include inner host destination address 506 and inner host source address 508, which may respectively represent layer 2 addresses, such as MAC addresses, of the destination and source hosts (i.e., endpoints). Original frame 502 may also contain other data 512 such as cyclic redundancy check (CRC) code or optional inner packet data according to the Institute of Electrical and Electronics Engineers (IEEE) 802.1Q standards.

Original frame 502 can be encapsulated at a tunnel endpoint, such as VTEPs 408A-408D as shown in FIG. 4, with overlay network encapsulation header 504. After traversing the overlay network with a help of the information contained in overlay network encapsulation header 504, encapsulated packet 500 can then be de-encapsulated at another tunnel endpoint. Overlay network encapsulated packet 500 may be treated as an L3 packet, such as a User Datagram Protocol (UDP) packet. Overlay network encapsulation header 504 may contain one or more data segments, such as outer host destination address 514, outer host source address 516, outer IP destination address 518, outer IP source address 520, outer UDP 522, VNID 524, and other data 526. Outer host destination address 514 may be an L2 address, such as a MAC address, for the destination tunnel endpoint (e.g., VTEP). Similarly, outer host source address 516 may be an L2 address, such as a MAC address, for the source tunnel endpoint that encapsulated overlay network encapsulated packet 500. Outer IP destination address 518 may be an L3 address, such as an IP address, attached to the destination tunnel endpoint. By the same token, outer IP source address 520 may represent the L3 address, such as the IP address, for the source tunnel endpoint where packet 500 was encapsulated.

Outer UDP 522 may contain information pertaining to a specific L3 protocol (e.g., UDP), such as a source port number, a destination port number, a length, a checksum, etc. However, one of ordinary skill in the art will readily recognize that data necessary for other types of protocols, such as TCP, may also be included depending on what type of overlay network the encapsulated packet is deployed in. VNID 524 may include information about which segregated virtual network in the overlay network the encapsulated packet pertains to. For example, in a VXLAN network, VNID 526 can be a 24-bit VXLAN ID. Other data 526 can be included in encapsulated packet 500 such as outer IEEE 802.1Q data.

Figure 6A:
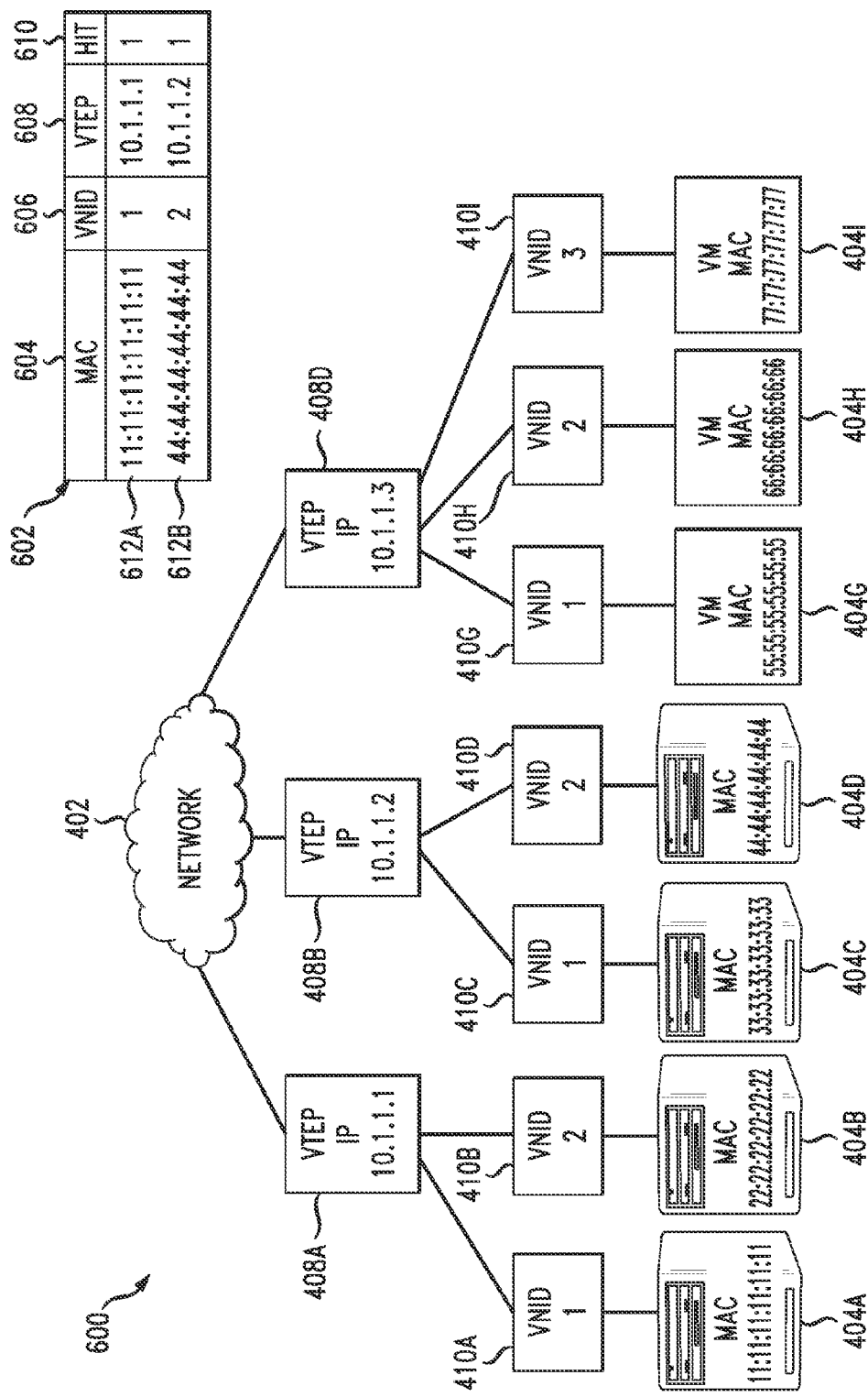
FIGS. 6A-6C illustrate schematic block diagrams of an example overlay network and an example routing table.

FIG. 6A illustrates a schematic block diagram of example overlay network 600 and example routing table 602. Overlay network 600 contains VTEPs 408A, 408B, 408D (collectively "408") connected via network 402, in a manner illustrated in FIG. 4. In addition, VTEPs 408 are tunnel endpoints that can originate and terminate encapsulated packets for endpoints (i.e., hosts) 404A-D, 404G-I (collectively "404"). Moreover, endpoints 404 are each assigned one of VNIDs 410A-D, 410G-I (collectively "410") so that each virtual network can stay segmented from each other. Hosts 404 may also be assigned layer 2 addresses (e.g., MAC addresses) such as 11:11:11:11:11:11, 22:22:22:22:22:22, 33:33:33:33:33:33, 44:44:44:44:44:44, 55:55:55:55:55:55, 66:66:66:66:66:66, and 77:77:77:77:77:77. On the other hand, layer 3 addresses (e.g., IP addresses) can be assigned to VTEPs 408 such as 10.1.1.1, 10.1.1.2, and 10.1.1.3. VTEPs 408 can be also assigned layer 2 addresses (not shown in FIG. 6A) so that each VTEP 408 can utilize its own unique IP/MAC address pair to handle both L2 and L3 packets and enable MAC-to-UDP encapsulation.

VTEPs 408 in overlay network 600 may each store, update, and manage an encapsulation table so that VTEPs 408 can properly determine how to route inbound and outbound traffic. In this example, encapsulation table 602 is an example table that is created, maintained, and referenced by VTEP 408D for handling outbound traffic (e.g., Ethernet frames) received from hosts 404G-I. Encapsulation table 602 may contain layer 2 address (e.g., MAC address) 604 and VNID 606 pairs mapped to layer 3 tunnel endpoint addresses (e.g., IP addresses) 608. For example, table entry 612B is shown to map the MAC/VNID pair of 44:44:44:44:44:44/2 to the VTEP address of 10.1.1.2. Optionally, each entry 612A-B in encapsulated table 602 may have a hit bit 610 associated with it. Hit bits 610, as will be discussed in more detail below, may indicate whether an associated entry in encapsulation table 602 has been updated or validated during a given period of time.

Encapsulation table 602 may not necessarily contain routing information about every single host 404 in overlay network 600. For instance, example encapsulation table 602 for VTEP 408D currently only contains two entries: entry 612A for host 404A and entry 612B for host 404D. According to example encapsulation table 602, host 404A has VNID 606 of 1 and is associated with the VTEP address 10.1.1.1 (corresponding to VTEP 408A). Encapsulation table 602 also indicates that host 404D is assigned VNID 606 of 2 and it is associated with the VTEP address 10.1.1.2 (corresponding to VTEP 408B). When VTEP 408D needs to forward an encapsulated packet to a host that is not listed in encapsulation table 602, VTEP 408D can broadcast the packet to all the other VTEPs in overlay network 600, as will be discussed in greater detail below.

When tunnel endpoint 408D receives an encapsulated packet from other VTEPs 408A-B, it may attempt to update encapsulation table 602 by looking up the inner host source address of the encapsulated packet in encapsulation table 602. If the lookup result is a miss, tunnel endpoint can insert the new association between the inner host source address and the outer IP source address into encapsulation table 602. On the other hand, if the lookup result is a hit, but the associated tunnel endpoint is different from what is recorded in encapsulation table 602, tunnel endpoint 408D can update the new association in encapsulation table 602. Moreover, if the lookup result is a hit and the association in encapsulation table 602 matches the inner host source address and outer IP source address pair in the encapsulated packet (i.e., the association has not changed), VTEP 408D does not have to alter encapsulation table 602 other than optionally setting the appropriate hit bit 610.

In these embodiments, since the number of active host addresses a given tunnel endpoint needs to be aware of may typically be much lower compared to the total number of all the host addresses in the overlay network, the size of encapsulation table 602 can be significantly smaller than that of a full database. In addition, since the address associations are learned from live traffic, there is no need for separate host address updates from a central controller to the individual tunnel endpoints. By eliminating distribution and processing of host updates from the central authority, the logic for handling routing information can be implemented in hardware to improve traffic throughput. This approach may also advantageously reduce the amount of database storage needed at tunnel endpoints.

Optionally, encapsulation table 602 may undergo aging and maintenance. Without proper maintenance, information in encapsulation table 602 may go stale after a period of time because the associations that existed among hosts and tunnel endpoints in the past may no longer exist as various aspects of overlay network 600 change over time, whether they be a host migration, a tunnel endpoint rearrangement, a VNID reassignment, a new host allocation, or a host termination. Therefore, it may be beneficial to remove table entries in encapsulation table 602 that are no longer relevant by "aging" each table entry 612A, 612B in encapsulation table 602. In some embodiments, this can be accomplished by the introduction of hit bits 610. A hit bit can be a single-bit dual-state status that can be either set ("1") or cleared ("0") at any given time. When set, the hit bit may indicate that the associated table entry has been updated or validated recently and is more likely to be "fresh." On the other hand, a cleared bit may indicate that the associated table entry has not been updated or validated for some time and the entry is more likely to be "stale." In other words, addresses in encapsulation table 602 with their hit bits set may be considered more likely to be "active," while those addresses whose hit bits have been cleared may be considered more likely to be "inactive."

Hit bits 610 can be set at any time the corresponding association between host source address 604 and IP source address 608 is validated and/or the corresponding table entry 612A, 612B is updated. For example, after tunnel endpoint 408D receives an encapsulated packet from host 404A (MAC address 11:11:11:11:11), it can update entry 612A in encapsulation table 602 as necessary and set the corresponding hit bit 610 as "1." Similarly, after tunnel endpoint 408D receives another encapsulated packet from host 404D (MAC address 44:44:44:44:44:44), tunnel endpoint 408D can update entry 612B in encapsulation table 602 as necessary and set the corresponding hit bit 610 as "1."

VTEP 408D can perform maintenance on encapsulation table 602 by examining hit bits 610 for table entries 612A, 612B and removing any stale entries (i.e., entries with hit bits cleared) from encapsulation table 602 and clearing any hit bits that have been set since the last maintenance (i.e., "1" to "0"). Maintenance may be performed on a regular basis. For example, VTEP 408D may perform aging and maintenance on encapsulation table 602 every 5 seconds, every 30 seconds, every 2 minutes, every hour, etc. For instance, if the predetermined regular time interval is 10 seconds, encapsulation table 602 may be refreshed every 10 seconds by removing all the entries that have not been updated or validated (i.e., entries whose hit bits have not been set) within the last 10 seconds, and clearing the hit bits for those entries that have been updated or validated (i.e., entries whose hit bits have been set) within the last 10 seconds. If any of the entries with the newly cleared bits do not get updated or validated within the next 10 seconds, they can be removed during the next maintenance round.

One of ordinary skill in the art will readily recognize that aging and maintenance can be performed on a dynamic schedule as well, where the time intervals may change. For example, during peak hours when there is more packet traffic, the entries in encapsulation table 602 can be aged faster so that they will be refreshed and pruned more often, while maintenance may be performed less often on encapsulation table 602 during slow hours. One of ordinary skill in the art will also understand that, instead of using binary bits, counters may be used for aging purposes in some alternate embodiments. For example, instead of simply setting the dual-status hit bit, a counter can be counted up every time the corresponding entry gets updated or validated, while the counter may decrease by a predetermined value every time maintenance is performed on encapsulation table 602. Entries that have counters below a threshold value may be removed at such maintenance time.

Figure 6B:
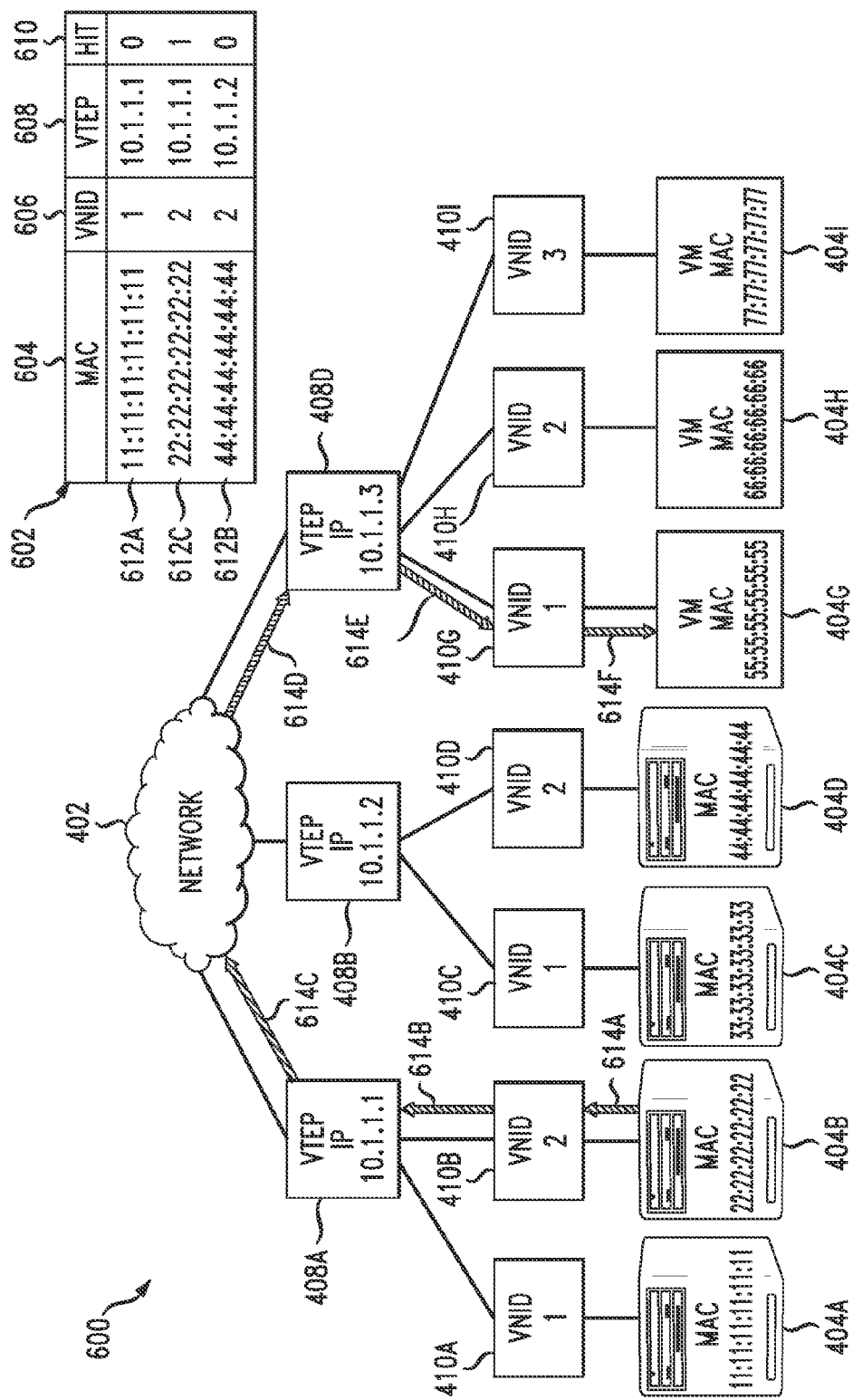

FIG. 6B illustrates a schematic block diagram of the continuing example of overlay network 600 and routing table 602 as shown in FIG. 6A. In this example, it is assumed that encapsulation table 602 has undergone maintenance at least once before the time that the events depicted in FIG. 6B have transpired. Thus, table entries 612A, 612B have been appropriately aged by having their hit bits 610 cleared to "0."

In this example, host 404B originates a packet that is destined for host 404G (614A) and forwards the packet to tunnel endpoint 408A (614B). In order for tunnel endpoint 408A encapsulate the received packet and to forward the encapsulated packet to its intended recipient, tunnel endpoint 408A may extract the host destination address from the packet and look up the address in its own encapsulation table (not shown). If a match is found for destination host address 55:55:55:55:55:55, tunnel endpoint 408A may use the encapsulation information (i.e., IP address 10.1.1.3) from its encapsulation table to encapsulate and forward the packet. If, however, the host address is not found in the encapsulation table, tunnel endpoint 408A can perform one of three possible operations depending on the operating mode of overlay network 600. The first operation is to consult a central controller (not shown) and populate the appropriate entry in its encapsulation table. The second option is to encapsulate the packet and send the encapsulated packet to a proxy tunnel endpoint (not shown) that may hold the full host database. The final option is to flood overlay network 600 by broadcasting the encapsulated packet to every tunnel endpoint in overlay network 600, as will be discussed in greater detail below.

Once destination IP address is identified, tunnel endpoint 408A may then encapsulate the packet by adding the IP address of tunnel endpoint 408A (i.e., 10.1.1.1) to the encapsulation header in a field such as outer IP source address 520 as shown in FIG. 5. The encapsulated packet may travel through network 402 (614C) and reach tunnel endpoint 408D (614D). Upon receiving the encapsulated packet, tunnel endpoint 408D may attempt to update encapsulation table 602 by determining whether an entry already exists for the inner host source address contained in the packet (i.e., 22:22:22:22:22:22). If such an entry already exists and if the IP address is different from what is already recorded in table 602, then the entry may be updated with the new source IP address (i.e., 10.1.1.1) and set its hit bit 610. On the other hand, if the IP address in the packet is the same as what is already recorded in encapsulation table 602, tunnel endpoint 408D can simply set the hit bit 610 without changing the address in the table entry. Moreover, if an entry for the host source address 22:22:22:22:22:22 does not yet exist in encapsulation table 602, tunnel endpoint 408D can create new entry 612C and record the association between the host source address 604 and IP source address 608. Corresponding VNID 606 may also be recorded and hit bit 610 can be set to "1." New table entry 612C can be used at a later time to determine what the appropriate IP destination address might be when tunnel endpoint 408D receives, from one of hosts 404G, 404H, 404I, a packet that is destined for host 404B.

Next, tunnel endpoint 408D may de-encapsulate the received packet by stripping the encapsulation header. Tunnel endpoint 408D may then forward the resulting de-encapsulated L2 frame to host 404G (614E, 614F).

Figure 6C:
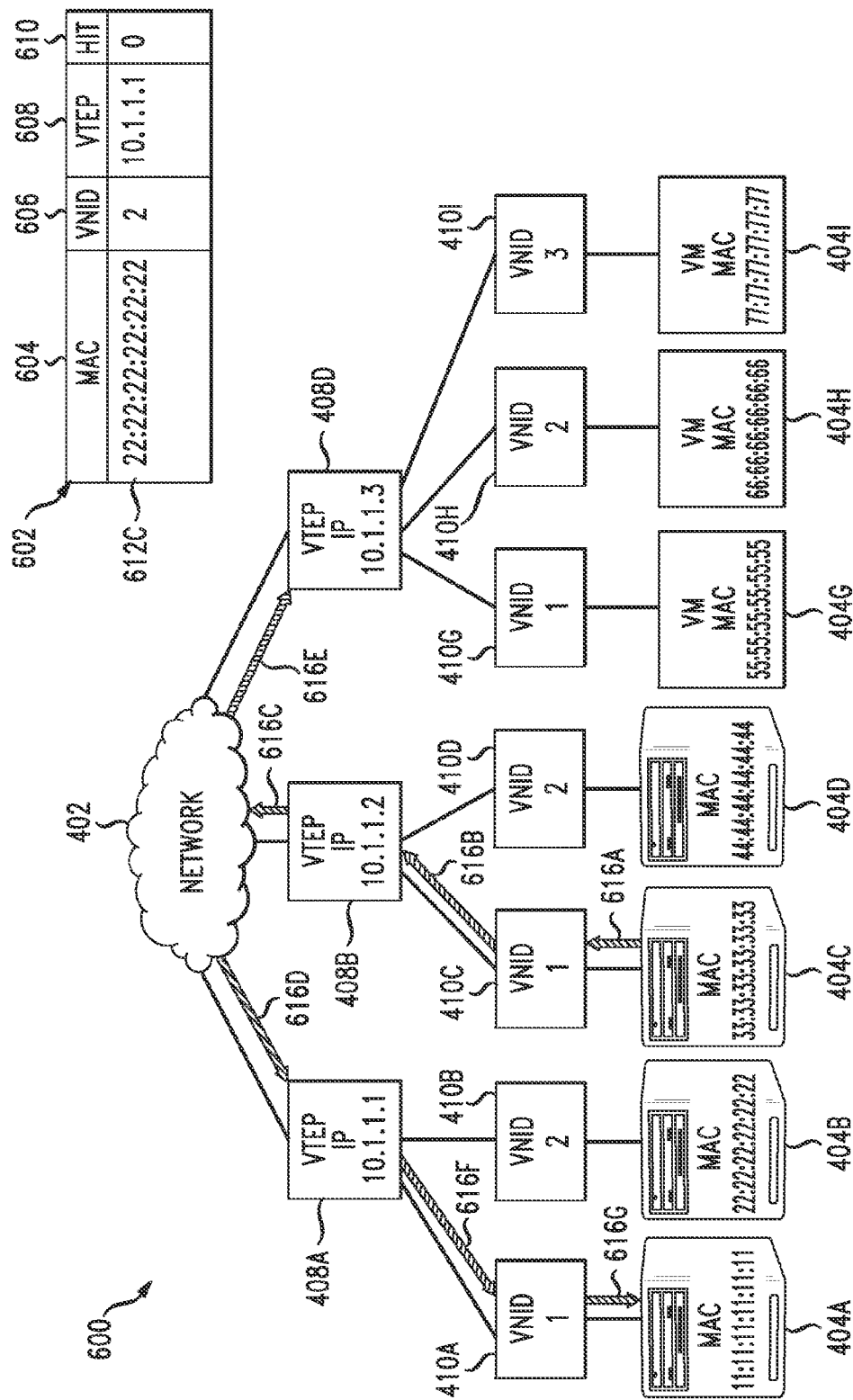

FIG. 6C illustrates a schematic block diagram of the continuing example of overlay network 600 and routing table 602 as shown in FIGS. 6A-B. It is assumed in this example that another round of routing information pruning has been performed on encapsulation table 602 before the events depicted in FIG. 6C have taken place. Therefore, table entries 612A, 612B, which had their hit bits 610 cleared during the previous round of maintenance, are shown to be removed from encapsulation table 602. Hit bit 610 for entry 612C has also been cleared during the most recent maintenance round. If entry 612C fails to get refreshed (i.e., updated or validated) before the next round of maintenance, it can be also removed from encapsulation table 602.

Also in this example, host 404C may originate an L2 packet (e.g., an Ethernet frame) that is destined for host 404A. Host 404C may send the packet to VTEP 408B (616A, 616B). In this example, VTEP 408B looks up in its encapsulation table (not shown) to determine which tunnel endpoint is associated with host 404A. However, in this example, VTEP 408B does not find routing information for host 404A (i.e., 11:11:11:11:11:11) in its encapsulation table. In such a case, VTEP 408B can create one or more encapsulated packets based on the received packet, and multicast or broadcast the encapsulated packets to all the other tunnel endpoints in overlay network 600 to make sure that at least one of the packets gets delivered to its intended destination (i.e., host 404A). In other words, VTEP 408B may broadcast encapsulated packets to VTEP 408A and VTEP 408D (616C). One of the broadcast encapsulated packets may reach VTEP 408A via network 402 (616D). After VTEP 408A determines that host 404A is indeed behind VTEP 408A, VTEP 408A can de-encapsulate the packet and forward the resulting de-encapsulated data frame to host 404A (616F, 616G). VTEP 408A may also update its encapsulation table (not shown) based on the association that it learned between the source host address 33:33:33:33:33:33 and the source IP address 10.1.1.2. Thus, the mapping between those two addresses can be updated in the encapsulation table or newly inserted into the table. The corresponding hit bit may also be set.

VTEP 408D may also receive via network 402 one of the encapsulated packets that have been broadcast out into overlay network 600 by VTEP 408B. However, after VTEP 408D looks up encapsulation table 602, it may discover that the destination host address (i.e., 11:11:11:11:11:11) in the received encapsulated packet is not associated with VTEP 408D. In other words, VTEP 408D may realize that the received packet was not really intended to be delivered to VTEP 408D.

In some embodiments, VTEP 408D may employ a technique called "conversation learning." In conversation learning, a tunnel endpoint can selectively acquire routing information by accepting information only from packets that are destined for hosts that are directly related to that tunnel endpoint (i.e., hosts that are behind the tunnel endpoint) and rejecting routing information from those packets that are not addressed to the hosts that are attached to that tunnel endpoint. Since the probability that the first tunnel endpoint might transmit a packet to the second tunnel endpoint is higher when the first tunnel had already received from the second tunnel endpoint a packet that was destined for a host behind the first tunnel endpoint (i.e., the first tunnel endpoint and the second tunnel endpoint are already in "conversation") than when the first tunnel endpoint has not received a packet from the second tunnel endpoint recently, conversation learning enables tunnel endpoints to manage their encapsulation tables more efficiently by reducing both the number of updates to the encapsulation table and the size of the encapsulation table. Returning to the example depicted in FIG. 6C, VTEP 408D may use conversation learning and choose not to update encapsulation table 602 based on the new association that it just learned between host 404C and VTEP 408B because the received encapsulation had not been addressed to one of the hosts 404G-I belonging to VTEP 408D, but rather was a broadcast packet. This decision is based on the expectation that there is a lower chance of VTEP 408D returning a packet to host 404C in the future because it is assumed that host 404C is currently not in conversation with one of hosts 404G-I.

Figure 7:
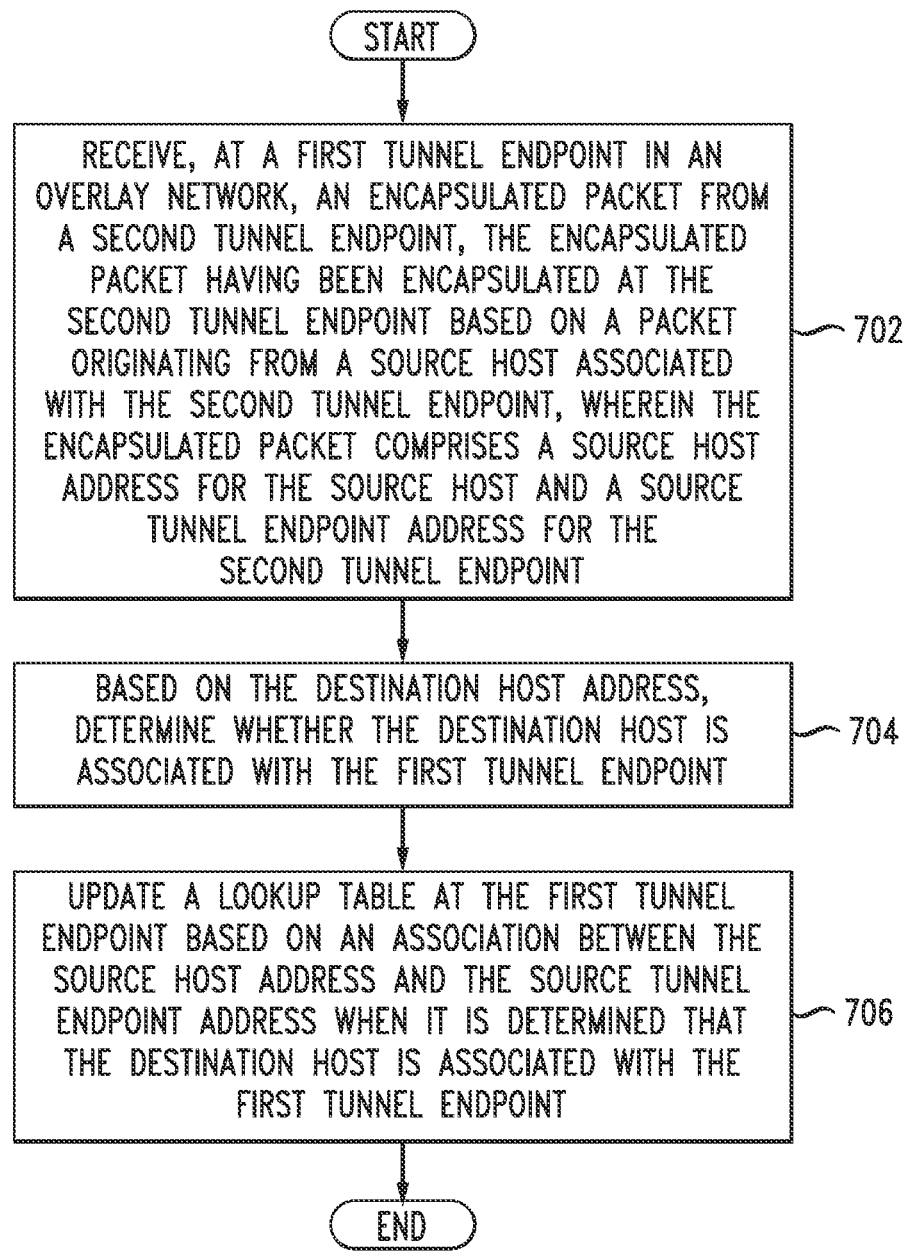
FIG. 7 illustrates an example method embodiment.
Figure 8:
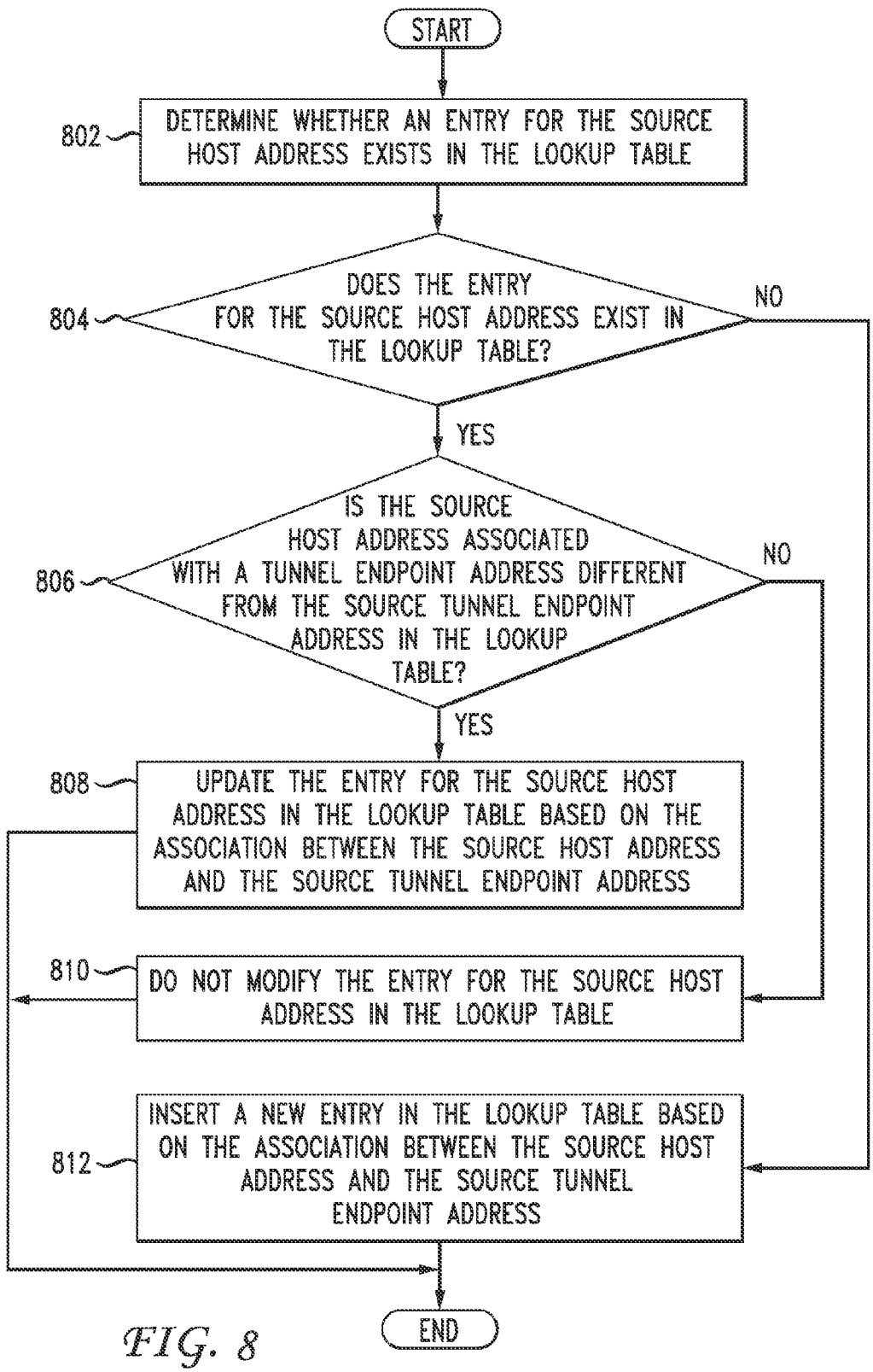
FIG. 8 illustrates another example method embodiment.

Having disclosed some basic system components and concepts, the disclosure now turns to the example method embodiments shown in FIGS. 7-8. For the sake of clarity, the methods are described in terms of system 110, as shown in FIG. 1, configured to practice the method. Alternatively, the methods can be practiced by system 200 as shown in FIG. 2A, computer system 250 as shown in FIG. 2B, or any of endpoints 310 as shown in FIG. 3. The steps outlined herein are example and can be implemented in any combination thereof in any order, including combinations that exclude, add, or modify certain steps.

FIG. 7 illustrates an example method embodiment. System 110 may receive, at a first tunnel endpoint in an overlay network, an encapsulated packet from a second tunnel endpoint, the encapsulated packet having been encapsulated at the second tunnel endpoint based on a packet originating from a source host associated with the second tunnel endpoint, wherein the encapsulated packet includes a source host address for the source host and a source tunnel endpoint address for the second tunnel endpoint (702). Here, the overlay network can be a VXLAN and the tunnel endpoint can be a VTEP. In addition, the source tunnel endpoint address can be an IP address and the source host address can be a MAC address. The encapsulated packet may also include a destination host address for a destination host. The encapsulated packet may also be a broadcast packet or a multicast packet.

Based on the destination host address, system 110 may determine whether the destination host is associated with the first tunnel endpoint (704). System 110 may then update a lookup table at the first tunnel endpoint based on an association between the source host address and the source tunnel endpoint address (706). In some embodiments implementing conversation learning, system 110 may update the lookup table only when it is determined that the destination host is associated with the first tunnel endpoint (706). Updating the lookup table may be performed by determining whether an entry for the source host address exists in the lookup table as will be discussed further in FIG. 8. System 110 may also set a hit bit in the lookup table where the hit bit is associated with the source host address.

System 110 may also perform maintenance on the lookup table by determining whether the hit bit is set. If the hit bit is not set, system 110 can delete the entry for the source host address from the lookup table and clear the hit bit. If the hit bit is set, on the other hand, system 110 can clear the hit bit. The maintenance may be performed on the lookup table periodically according to a predetermined schedule.

System 110 may receive at the first tunnel endpoint an outbound packet from a host associated with the first tunnel endpoint. The outbound packet may include a destination host address. The destination tunnel endpoint address can be an IP address and the destination host address can be a MAC address. Based on the lookup table, system 110 can determine a destination tunnel endpoint address that is associated with the destination host address. System 110 can encapsulate the outbound packet with an overlay network header such as a VXLAN encapsulation header. System 110 can then transmit the outbound packet from the first tunnel endpoint to the destination tunnel endpoint address.

FIG. 8 illustrates an example method embodiment for updating a lookup table at a tunnel endpoint. System 110 may determine whether an entry for the source host address exists in the lookup table (802). If the entry for the source host address does not exist in the lookup table (804), system 110 can insert a new entry in the lookup table based on the association between the source host address and the source tunnel endpoint address (812). On the other hand, if the entry for the source host address does exist in the lookup table (804) and the source host address is associated with a tunnel endpoint address different from the source tunnel endpoint address in the lookup table (806), system 110 can update the entry for the source host address in the lookup table based on the association between the source host address and the source tunnel endpoint address (808). However, if the entry for the source host address exists in the lookup table (804) but the source host address is associated with the same tunnel endpoint address as the source tunnel endpoint address in the lookup table (806), system 110 may choose not to modify the entry for the source host address in the lookup table (810). Regardless of whether the entry for the source host address had already existed in the lookup table (804), system 110 can set a hit bit associated with the source host address to mark the address as being "active."

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

We claim:

1. A method comprising:
    receiving, at a first tunnel endpoint in an overlay network, an encapsulated packet from a second tunnel endpoint, the encapsulated packet having been encapsulated at the second tunnel endpoint based on a packet originating from a source host associated with the second tunnel endpoint, wherein the encapsulated packet comprises a source host address for the source host and a source tunnel endpoint address for the second tunnel endpoint; and
    updating a lookup table at the first tunnel endpoint based on an association between the source host address and the source tunnel endpoint address, wherein updating the lookup table further comprises:
    determining whether an entry for the source host address exists in the lookup table, and
    when the entry for the source host address exists in the lookup table and the source host address is associated with a tunnel endpoint address different from the source tunnel endpoint address in the lookup table, updating the entry for the source host address in the lookup table based on the association between the source host address and the source tunnel endpoint address.

2. The method of claim 1, wherein the source tunnel endpoint address is an Internet protocol (IP) address and the source host address is a media access control (MAC) address.

3. The method of claim 1, wherein the overlay network is a virtual extensible local area network (VXLAN) and the tunnel endpoint is a virtual tunnel endpoint (VTEP).

4. The method of claim 1, wherein the encapsulated packet further comprises a destination host address for a destination host, the method further comprising:
    based on the destination host address, determining whether the destination host is associated with the first tunnel endpoint,
    wherein the lookup table is updated only when it is determined that the destination host is associated with the first tunnel endpoint.

5. The method of claim 4, wherein the encapsulated packet is one of a broadcast packet or a multicast packet.

6. The method of claim 1, wherein updating the lookup table further comprises:
    when the entry for the source host address does not exist in the lookup table, inserting a new entry in the lookup table based on the association between the source host address and the source tunnel endpoint address.

7. The method of claim 1, wherein updating the lookup table further comprises:

when the entry for the source host address exists in the lookup table and the source host address is associated with the source tunnel endpoint address in the lookup table, not modifying the entry for the source host address in the lookup table.

8. The method of claim 1, wherein updating the lookup table further comprises:
setting a hit bit in the lookup table, the hit bit being associated with the source host address.

9. The method of claim 8, further comprising:
performing maintenance on the lookup table by:
determining whether the hit bit is set;
when it is determined that the hit bit is not set, deleting the entry for the source host address from the lookup table; and
clearing the hit bit.

10. The method of claim 9, wherein the maintenance is performed on the lookup table periodically according to a predetermined schedule.

11. The method of claim 1, further comprising:
receiving, at the first tunnel endpoint, an outbound packet from a host associated with the first tunnel endpoint, the outbound packet comprising a destination host address;
based on the lookup table, determining a destination tunnel endpoint address that is associated with the destination host address;
transmitting the outbound packet from the first tunnel endpoint to the destination tunnel endpoint address.

12. The method of claim 11, further comprising:
prior to transmitting the outbound packet, encapsulating the outbound packet with an overlay network header.

13. The method of claim 11, wherein the destination tunnel endpoint address is an IP address and the destination host address is a MAC address.

14. A system comprising:
a processor; and
a non-transitory computer-readable storage medium storing instructions which, when executed by the processor, cause the processor to perform operations comprising:
receiving, at a first tunnel endpoint in an overlay network, a packet from a source host associated with the first tunnel endpoint, the packet comprising a destination host address, a source host address and a source tunnel endpoint;
based on a lookup table, determining a destination tunnel endpoint address that is associated with the destination host address, wherein the first tunnel endpoint is configured to update the lookup table with an association between a host address and a tunnel endpoint address by determining whether an entry of the source host address exists in the lookup table and the source host address is associated with a tunnel endpoint address different from the source tunnel endpoint address in the lookup table, and updating the entry of the source host address in the lookup table based on the association between the source host address and the source tunnel address when the first tunnel endpoint receives an incoming encapsulated packet comprising the source host address and the tunnel endpoint address;
encapsulating the packet with a header comprising the destination tunnel endpoint address to yield an encapsulated packet; and
transmitting the encapsulated packet from the first tunnel endpoint to the destination tunnel endpoint address.

15. The system of claim 14, wherein the destination tunnel endpoint address is an IP address and the destination host address is a MAC address.

16. The system of claim 14, wherein the overlay network is a VXLAN and the tunnel endpoint is a VTEP.

17. The system of claim 14, wherein the first tunnel endpoint is further configured to update the lookup table with the association between the host address and the tunnel endpoint address only when the incoming encapsulated packet, received by the first tunnel endpoint, is destined for a host that is associated with the first tunnel endpoint.

18. A non-transitory computer-readable storage medium storing instructions which, when executed by a processor, cause the processor to perform operations comprising:
receiving, at a first tunnel endpoint in an overlay network, an encapsulated packet from a second tunnel endpoint, the encapsulated packet having been encapsulated at the second tunnel endpoint based on a packet originating from a source host associated with the second tunnel endpoint, wherein the encapsulated packet comprises a source host address for the source host, a source tunnel endpoint address for the second tunnel endpoint, and a destination host address for a destination host;
based on the destination host address, determining whether the destination host is associated with the first tunnel endpoint, and
when it is determined that the destination host is associated with the first tunnel endpoint, updating a lookup table at the first tunnel endpoint based on an association between the source host address and the source tunnel endpoint address, wherein updating the lookup table further comprises:
determining whether an entry of the source host address exists in the lookup table and when the source host address is associated with a tunnel end point address different from the source tunnel endpoint address in the lookup table, updating the entry of the source host address in the lookup table based on the association between the source host address and the source tunnel address.

* * * * *